United States Patent
Liu (10) Patent No.: US 9,055,836 B2
(45) Date of Patent: Jun. 16, 2015

(54) TEA BREWER STRUCTURE CONFIGURED FOR EASY DISASSEMBLY AND CLEANING

(71) Applicant: Ming-Tung Liu, Taipei (TW)

(72) Inventor: Ming-Tung Liu, Taipei (TW)

( * ) Notice: Subject to any disclaimer, the term of this patent is extended or adjusted under 35 U.S.C. 154(b) by 299 days.

(21) Appl. No.: 13/668,363

(22) Filed: Nov. 5, 2012

(65) Prior Publication Data

US 2014/0123856 A1    May 8, 2014

(51) Int. Cl.
A47J 31/06 (2006.01)
A47J 31/00 (2006.01)
A47J 31/44 (2006.01)

(52) U.S. Cl.
CPC ............ *A47J 31/005* (2013.01); *A47J 31/0605* (2013.01); *A47J 31/061* (2013.01); *A47J 31/0615* (2013.01); *A47J 31/0626* (2013.01); *A47J 31/4482* (2013.01)

(58) Field of Classification Search
CPC .............................. A47J 31/061; A47J 31/0605
USPC .................................... 99/299, 306, 317, 323
See application file for complete search history.

(56) References Cited

U.S. PATENT DOCUMENTS

| | | | | |
|---|---|---|---|---|
| 1,701,194 | A * | 2/1929 | Rosenstein et al. | 99/285 |
| 6,327,965 | B1 * | 12/2001 | Lin Tien | 99/299 |
| 8,485,089 | B2 * | 7/2013 | Taylor et al. | 99/306 |

* cited by examiner

*Primary Examiner* — Reginald L Alexander
(74) *Attorney, Agent, or Firm* — Bacon & Thomas, PLLC (57) ABSTRACT

The present invention is to provide a tea brewer, which includes a container main body having a top side concavely provided with a receiving space for receiving liquid and coffee powder (or tea leaves) and a bottom side formed with a through hole in communication with the receiving space, at least one engaging element each provided on the bottom side and having at least one groove, a water-stopping plate having a post which extends into the receiving space through the through hole and peripherally provided with at least one guide rail each of which is movably received in the corresponding groove, and a water-stopping block detachably connected to the post and located in the receiving space. Since each guide rail extends into the corresponding groove with ease and without being compressed or deformed, it is easy for a user to remove the water-stopping plate from the tea brewer for cleaning.

6 Claims, 8 Drawing Sheets

TEA BREWER STRUCTURE CONFIGURED FOR EASY DISASSEMBLY AND CLEANING

FIELD OF THE INVENTION

The present invention relates to a tea brewer, more particularly to a tea brewer capable of being conveniently assembled and disassembled for allowing a user to easily remove and clean a water-stopping plate installed therein.

BACKGROUND OF THE INVENTION

Drinks like tea and coffee contain ingredients beneficial to the human health. For example, a tea infusion contains such wholesome ingredients as carbohydrates, proteins, free amino acids, fatty acids, polyphenols, organic acids, plant alkaloids, and minerals. At the same time, a cup of coffee contains caffeine, antioxidants, polyphenols, proteins, tannins, linoleic acid, alkaloids, and so on. Therefore, many people would like to drink tea or coffee during or after work in order to reinvigorate themselves and maintain or enhance health.

Figure 1:
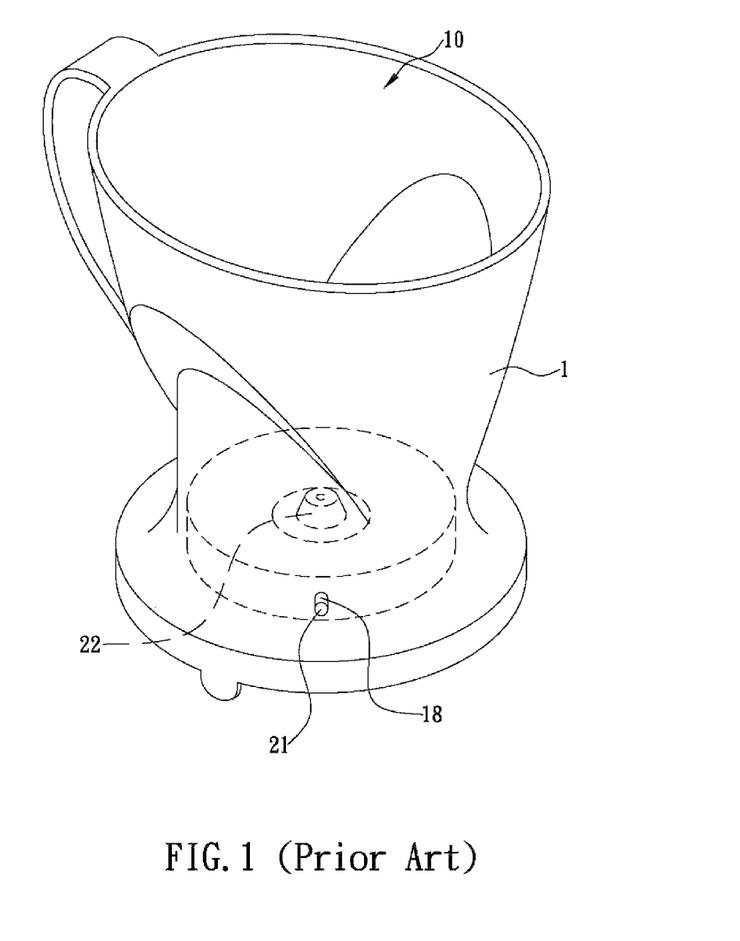
FIG. 1 is an assembled perspective view of a conventional tea brewer.
Figure 2:
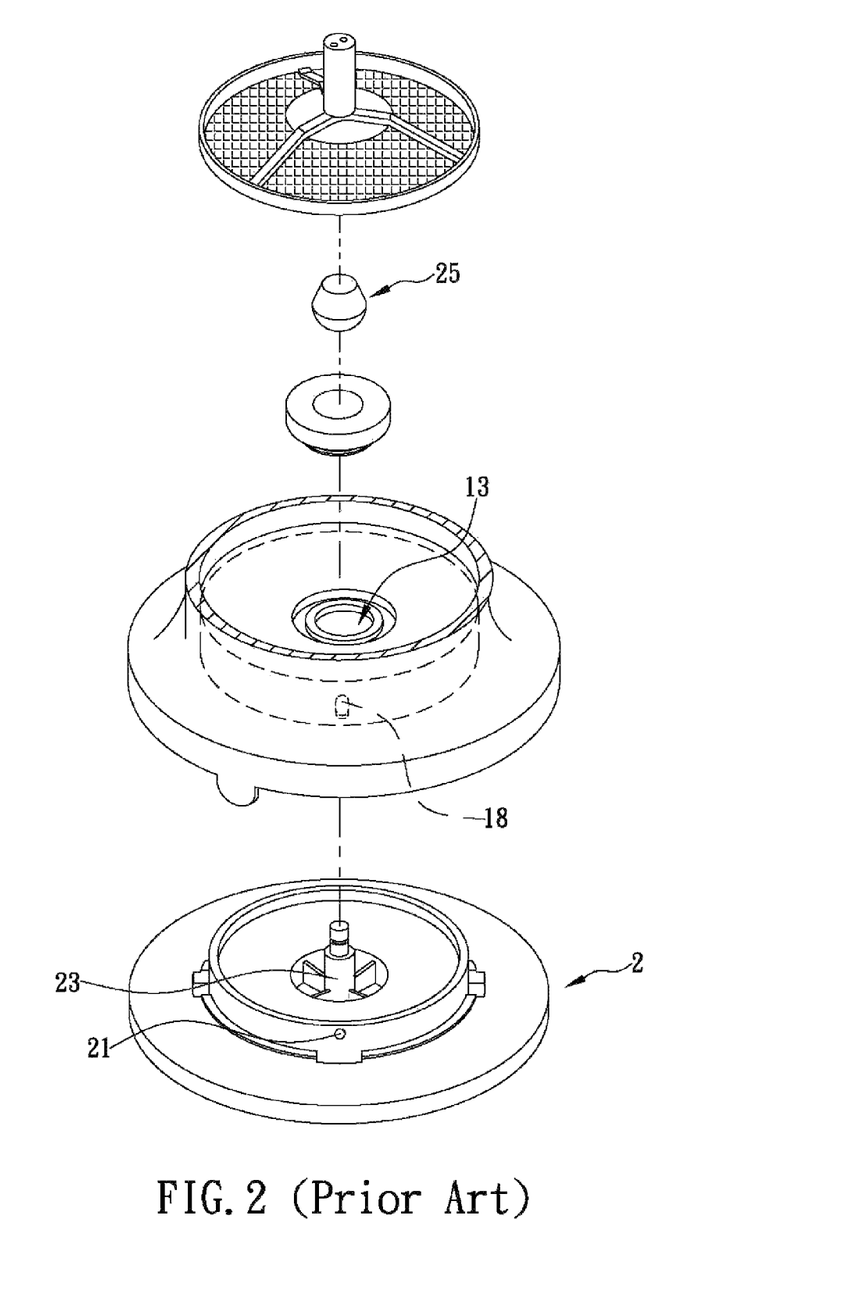
FIG. 2 is a partial exploded perspective view of the conventional tea brewer depicted in FIG. 1.

In view of the above, the inventor of the present invention developed a tea brewer which is easily portable and can make tea or coffee rapidly, as described in further detail below. Referring to FIGS. 1 and 2, the tea brewer 1 has a top side concavely provided with a receiving space 10 and a bottom side formed with a through hole 13. Also, the tea brewer 1 is peripherally provided with a plurality of assembly holes 18 (only one shown in FIGS. 1 and 2) adjacent to the bottom side of the tea brewer 1. A water-stopping plate 2 is detachably connected to the bottom side of the tea brewer 1 and is peripherally provided with a plurality of projecting rods 21 (only one shown in FIG. 2) which are respectively inserted in the assembly holes 18 and are reciprocally movable up and down therein. The water-stopping plate 2 is centrally provided with a post 23 which extends into the through hole 13 and whose top end is detachably connected with a water-stopping block 25. When the tea brewer 1 is placed on a tabletop and the water-stopping plate 2 has fallen naturally, each projecting rod 21 presses against the lower edge of the corresponding assembly hole 18, and the water-stopping block 25 covers the through hole 13 completely (as shown in FIG. 1) to prevent the liquid in the receiving space 10 from flowing out through the through hole 13. When the tea brewer 1 is placed on a cup, each projecting rod 21 is pressed against the upper edge of the corresponding assembly hole 18 instead, and the water-stopping block 25 is moved to a position where it no longer covers the through hole 13; as a result, the liquid in the receiving space 10 is allowed to flow out via the through hole 13. Hence, while a drink such as tea or coffee is brewed in the tea brewer 1, there is no need to worry that the drink may flow out of the tea brewer 1. When brewing is completed, the user only has to place the tea brewer 1 on a cup, and the drink in the tea brewer 1 will flow into the cup automatically. As such, the tea brewer 1 features great convenience of use.

However, after continued research in the tea brewer-related fields, the inventor has found that the tea brewer 1 still has its drawbacks in use and may result in poor user experiences. First of all, referring back to FIGS. 1 and 2, the projecting rods 21 are integrally formed with the water-stopping plate 2 and are not retractable. Therefore, in order to connect the water-stopping plate 2 to the bottom side of the tea brewer 1, the projecting rods 21 must be deformed, or they cannot be inserted into their respective assembly holes 18. When it is desired to remove the water-stopping plate 2 for cleaning, the projecting rods 21 must be deformed again so as to be released from the assembly holes 18. Thus, neither the installation nor the removal the water-stopping plate 2 can be completed without the user applying considerable force to deform the projecting rods 21. This not only causes inconvenience in use but also subjects the junctions between the projecting rods 21 and the water-stopping plate 2 to a great stress and consequently the risk of breakage, which, if happening, will render the tea brewer 1 useless. Moreover, the inconvenient removal of the water-stopping plate 2 from the tea brewer 1 adds to the difficulty of cleaning. After all, the tiny gaps between the water-stopping plate 2 and the tea brewer 1 in the connected state make it impossible to directly clean or wipe the water-stopping plate 2, but if it is desired to detach the water-stopping plate 2 for cleaning, the projecting rods 21 are subject to the aforesaid risk of breakage. Consequently, the cleaning of the water-stopping plate 2 becomes a stressful task for the user.

Figure 3:
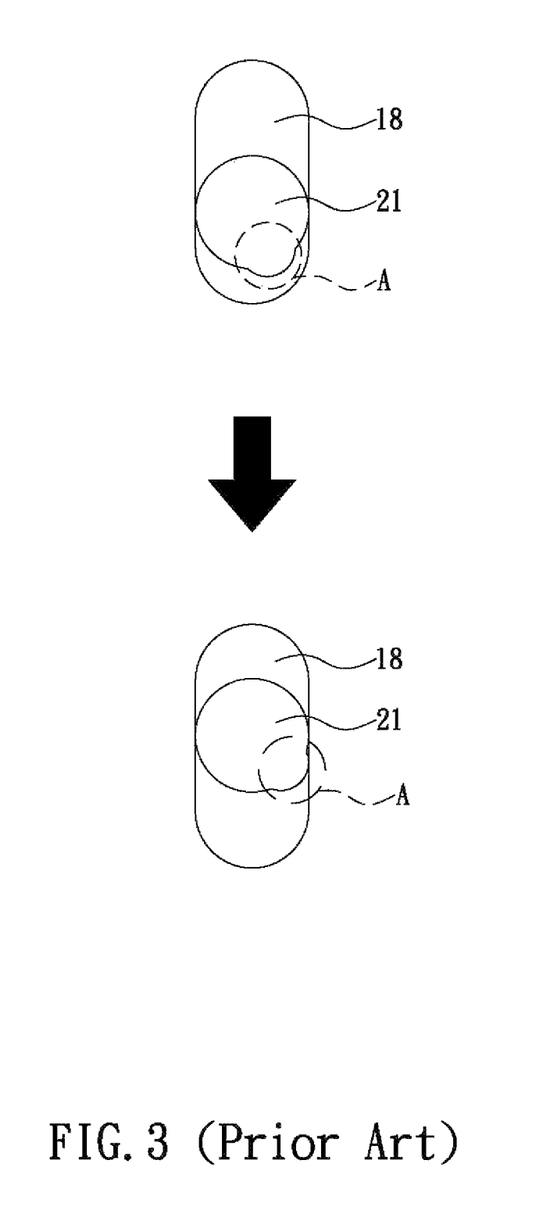
FIG. 3 schematically shows the operation between an assembly hole and a projecting rod of the conventional tea brewer depicted in FIG. 1.

Secondly, referring to FIGS. 1 and 2, the operation between the water-stopping plate 2 and the tea brewer 1 is, in most cases, tested by the manufacturer by moving the water-stopping plate 2 vertically back and forth. More specifically, the water-stopping plate 2 under test is displaced with respect to a cup while the bottom side of the water-stopping plate 2 remains parallel to the top side of the cup. In practical use, however, the user may not necessarily keep the bottom side of the water-stopping plate 2 parallel to the top side of a cup when placing the tea brewer 1 on the cup. Chances are a lateral edge of the water-stopping plate 2 will contact with the cup before the entire water-stopping plate 2 is laid on the cup. In consequence, the water-stopping plate 2 is displaced in an inclined manner, and due to the typically circular cross-sectional shape of the projecting rods 21, the water-stopping plate 2 can tilt at a large angle. Here comes the problem. If there is a dented, bumpy, or otherwise irregular surface (as indicated by the dashed-line circles in FIG. 3) on the inner wall of any assembly hole 18 or on the periphery of any projecting rod 21, the manufacturer, who generally does not test the tea brewer 1 by displacing the water-stopping plate 2 at an angle, is unlikely to find the irregular surface, which, if present and if the projecting rods 21 are rotated as a result of the user's slantwise displacement of the water-stopping plate 2, may cause the projecting rods 21 to be stuck in the assembly holes 18 (as shown in FIG. 3), thereby preventing the water-stopping plate 2 from falling naturally. Should the water-stopping plate 2 fail to fall as intended, a lifting of the tea brewer 1 from the cup will leave the through hole 13 open, i.e., without being covered by the water-stopping block 25, and the liquid in the tea brewer 1 will keep flowing out through the through hole 13 and thus soil the tabletop.

According to the above, the existing tea brewers are still flawed in terms of use, and because of that, research and development efforts have been made by tea brewer manufacturers to provide consumers with better and more convenient products and to effectively secure a larger market share. One important issue facing the tea brewer manufacturers nowadays, and also the key to survival in this competitive market, is to overcome the aforementioned drawbacks without compromising the performances of known tea brewers.

BRIEF SUMMARY OF THE INVENTION

In view of the various problems with the use of the conventional tea brewers, the inventor of the present invention conducted extensive research and experiment and finally succeeded in developing a tea brewer structure configured for easy disassembly and cleaning It is hoped that the present invention can solve the foregoing problems effectively.

It is an object of the present invention to provide a tea brewer structure configured for easy disassembly and cleaning More particularly, it is an object of the present invention to provide a tea brewer structure in which the water-stopping plate can be easily installed, removed, and cleaned. The tea brewer structure includes a container main body, at least one engaging element, a water-stopping plate, and a water-stopping block. The container main body has a top side concavely provided with a receiving space for receiving a liquid and a brewing material (e.g., coffee powder or tea leaves). The bottom side of the container main body is formed with a through hole in communication with the receiving space. The at least one engaging element may be an annular body or each be composed of a plurality of engaging plates. The at least one engaging element is provided on the bottom side of the container main body and is provided with at least one groove extending inward from the bottom side of each engaging element. The water-stopping plate is detachably connected to the bottom side of the container main body and has a top side provided with a post, wherein the post extends into the receiving space through the through hole. The water-stopping plate is further provided with at least one flow-guiding hole adjacent to the post such that liquid flowing out of the through hole can flow into each flow-guiding hole. Also, the water-stopping plate is peripherally provided with at least one guide rail received and movably up and down in the corresponding groove. The water-stopping block is detachably connected to the post and is located in the receiving space. When the top side of each guide rail is pressed against the bottom surface of the corresponding groove, the water-stopping block does not cover the through hole. When the top side of each guide rail is moved away from the state of being pressed against the bottom surface of the corresponding groove, the water-stopping block is moved toward the through hole until the through hole is covered by the water-stopping block. As the at least one groove on the at least one engaging element extends inward from the bottom side of each engaging element, each guide rail can extend into the corresponding groove with ease and without being compressed or deformed. Thus, the tea brewer structure can be conveniently assembled and disassembled, allowing the user to easily remove the water-stopping plate for cleaning.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 4:
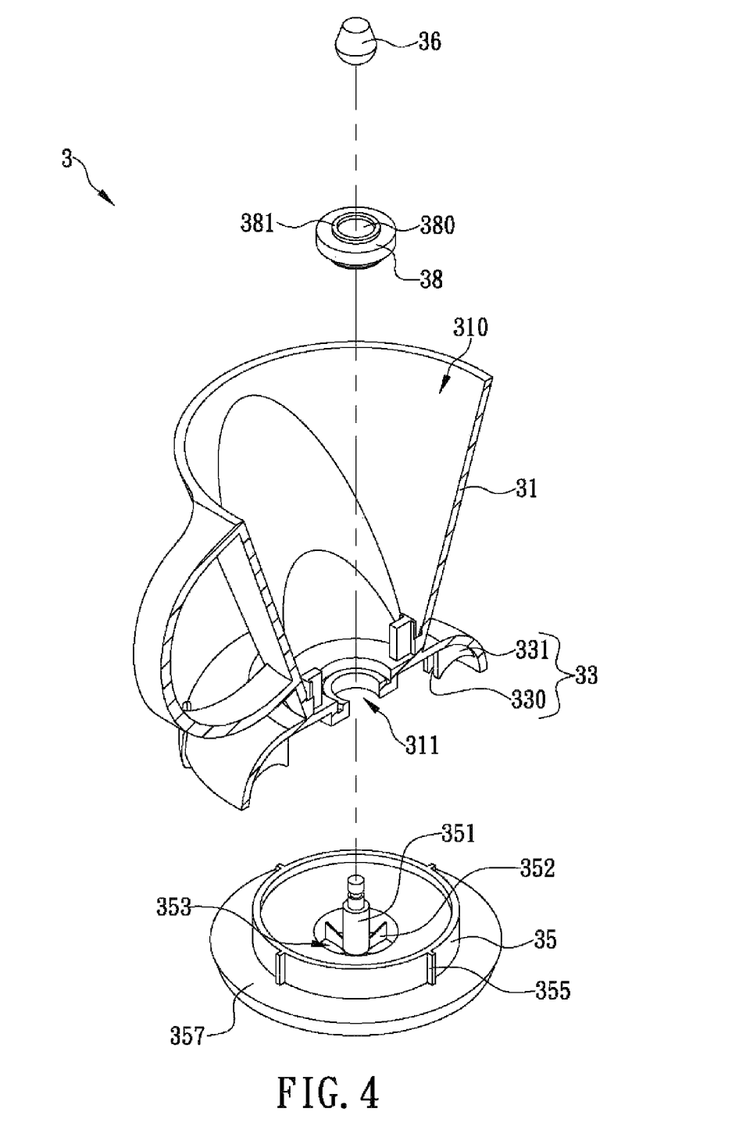
FIG. 4 is an exploded perspective view of a tea brewer according to the present invention.

The present invention discloses a tea brewer structure configured for easy disassembly and cleaning The term "tea brewer" is a general product name in the industry and is not intended to limit the use of the disclosed tea brewer to brewing tea only. The tea brewer of the present invention can be used to brew coffee just as well. Referring to FIG. 4 for a preferred embodiment of the present invention, the tea brewer 3 includes a container main body 31, at least one engaging element 33, a water-stopping plate 35, and a water-stopping block 36. The top side of the container main body 31 is concavely provided with a receiving space 310 into which a user may add a liquid (e.g., hot water) and a brewing material (e.g., coffee powder or tea leaves) for brewing. It should be pointed out that the shape of the container main body 31 shown in FIG. 4 is only one aspect of the present invention and is not restrictive of the present invention. A person skilled in the art who has fully understood the technical features of the present invention may change the shape of each component disclosed herein. The bottom side of the container main body 31 is formed with a through hole 311. The through hole 311 communicates with the receiving space 310 so that liquid in the receiving space 310 can flow out through the through hole 311. The receiving space 310 can be fitted with necessary components, such as a filter for filtering out tea leaves or coffee powder that has been used for brewing.

Figure 5:
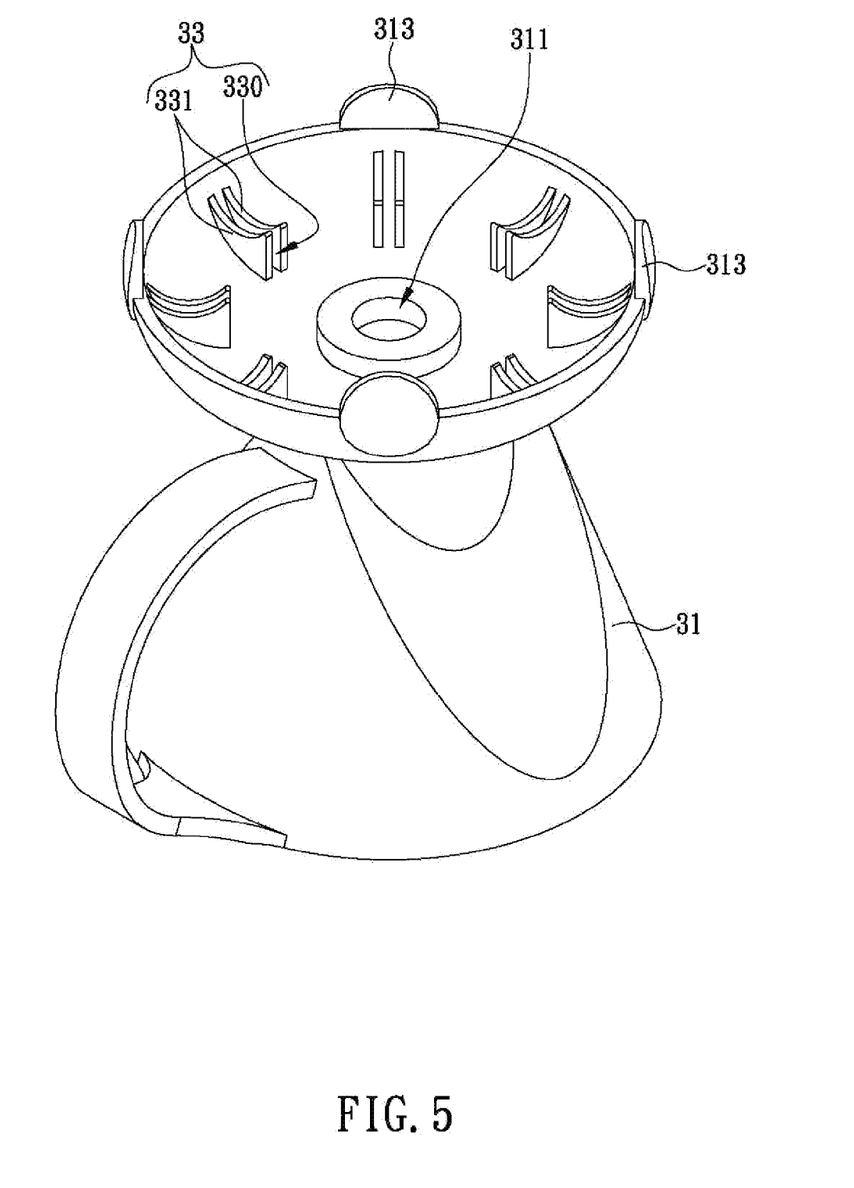
FIG. 5 is a perspective view of a container main body according to an embodiment of the present invention.

In the embodiment shown in FIGS. 4 and 5, the bottom side of the container main body 31 has an inverted U-shaped cross section and is peripherally provided with a plurality of foot plates 313. The foot plates 313 enable the container main body 31 to stand on a plane (e.g., a tabletop), thereby defining a vertical movement space between the bottom side of the container main body 31 and the plane. In other embodiments of the present invention, however, the configuration of the bottom side of the container main body 31 and the locations of the foot plates 313 may vary with product design. The bottom side of the container main body 31 is further provided with a plurality of engaging plates 331, wherein each two adjacent engaging plates 331 form one engaging element 33 and are separated by a spacing that defines a groove 330. It should be noted that, while each engaging element 33 in FIG. 5 is composed of two separate engaging plates 331, the two engaging plates 331 of each engaging element 33 in a different embodiment may be partially connected to each other (e.g., on the top side or on the side away from the through hole 311). In fact, the at least one engaging element 33 of the present invention may take various forms, provided that each engaging element 33 has one groove 330 extending inward from the bottom side of the engaging element 33, i.e., extending from the bottom side of the engaging element 33 toward the top side of the container main body 31.

Figure 6:
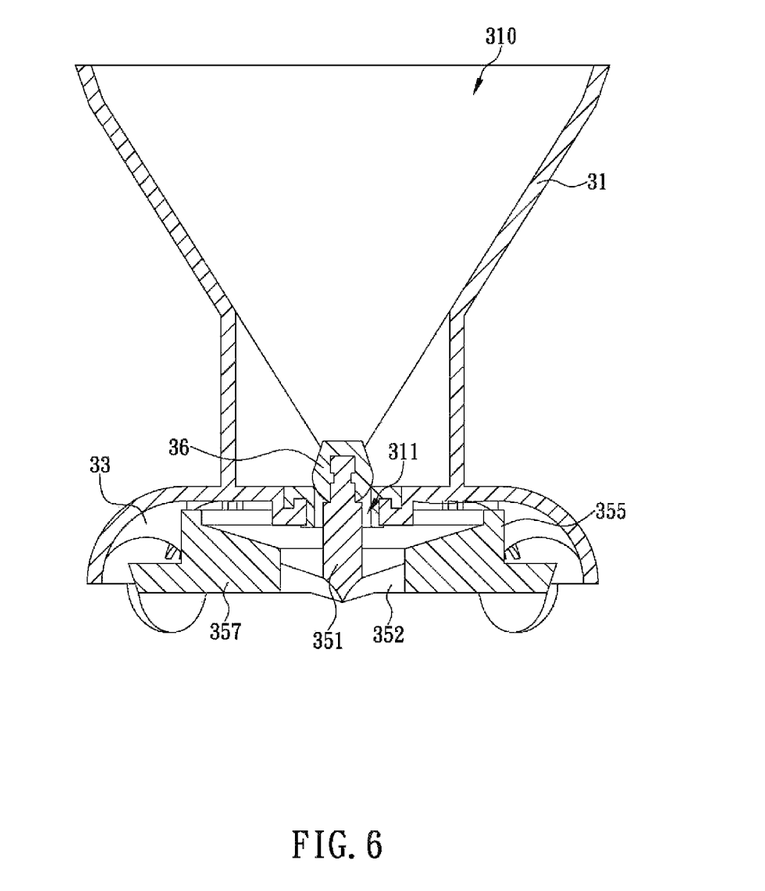
FIG. 6 is a sectional view of a tea brewer according to the present invention.

Referring now to FIGS. 4 and 6, the water-stopping plate 35 is detachably connected to the bottom side of the container main body 31 and can be displaced in the vertical movement space. The top side of the water-stopping plate 35 is protrudingly provided with a post 351. The post 351 extends into the receiving space 310 via the through hole 311 and has a top end detachably connected with the water-stopping block 36. With the maximum lateral width of the water-stopping block 36 being greater than the maximum diameter of the through hole 311, the water-stopping block 36 cannot pass through the through hole 311 from within the receiving space 310. As such, the water-stopping block 36 prevents the water-stopping plate 35 from coming off the bottom side of the container main body 31. Moreover, the water-stopping plate 35 is provided with at least one flow-guiding hole 353 adjacent to the post 351. Each flow-guiding hole 353 penetrates the top side and the bottom side of the water-stopping plate 35 such that liquid flowing out of the through hole 311 can flow through the water-stopping plate 35 via each flow-guiding hole 353. When there are a plurality of flow-guiding holes 353 formed around the post 351, the post 351 can be fixed to the water-stopping plate 35 by at least one connecting plate 352. Also, the water-stopping plate 35 is peripherally provided with at least one guide rail 355. Each guide rail 355 is formed as a rectangular column and is received and movable up and down in the corresponding groove 330. When the top side of each guide rail 355 is pressed against the inner bottom surface of the corresponding groove 330, the water-stopping block 36 does not cover the through hole 311. When the top side of each guide rail 355 is moved away from the state of being pressed against the inner bottom surface of the corresponding groove 330, the water-stopping block 36 is moved toward the through hole 311 until it covers the through hole 311. Thus, by displacing the water-stopping plate 35, the covering relationship between the water-stopping block 36 and the through hole 311 can be changed to guide the drink in the container main body 31 into a cup.

Figure 7:
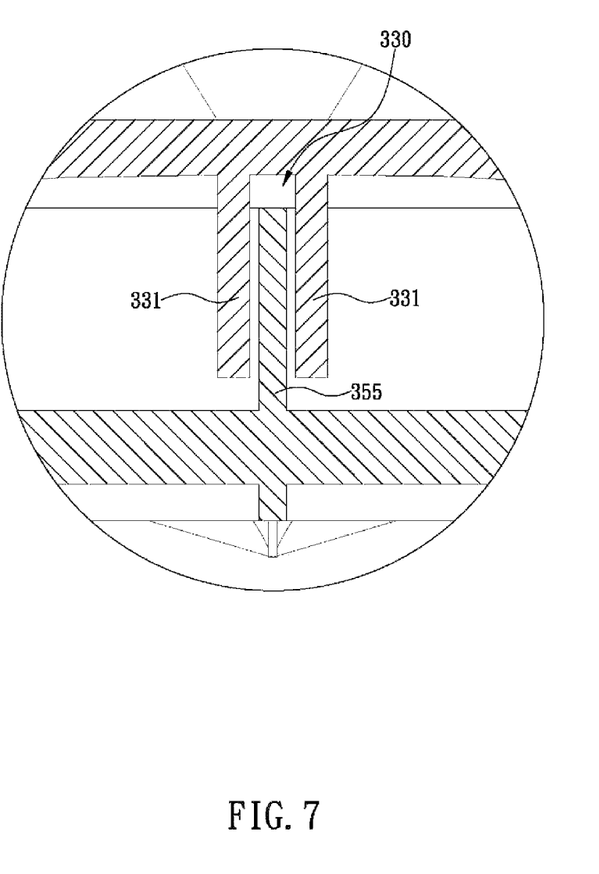
FIG. 7 is a partial enlarged sectional view of an engaging element and a guide rail according to the present invention.

Referring to FIGS. 4 and 7, the longitudinal length of each guide rail 355 is far greater than the lateral width of the corresponding groove 330. Consequently, the tilt angle of the water-stopping plate 35 is limited to 0~5 degrees, meaning that the lateral walls of each groove 330 will stay substantially parallel to the longitudinal surface of the corresponding guide rail 355. Therefore, as long as the water-stopping plate 35 can be properly displaced with respect to the container main body 31 during a test conducted by the manufacturer, no guide rail 355 will be stuck in the corresponding groove 330 during use. In other words, the water-stopping plate 35 will remain in a naturally fallen state provided that it is not pressed by a cup. Thus, the tea brewer 3 features great convenience of use. Moreover, with each groove 330 in the present invention extending inward from the bottom side of the corresponding engaging element 33, and with the water-stopping block 36 preventing the water-stopping plate 35 from separation from the container main body 31, each guide rail 355 can be directly inserted into the corresponding groove 330 without deformation when the user tries to connect the water-stopping plate 35 to the container main body 31. By the same token, the water-stopping plate 35 can be easily detached from the container main body 31. In short, the at least one engaging element 33 in the present invention is so configured that not only is the at least one guide rail 355 protected from breaking during installation and removal of the water-stopping plate 35, but also the water-stopping plate 35 can be conveniently and rapidly connected to the bottom side of the container main body 31 for use and easily removed therefrom for cleaning This ensures good user experiences with the tea brewer 3 of the present invention.

Figure 8:
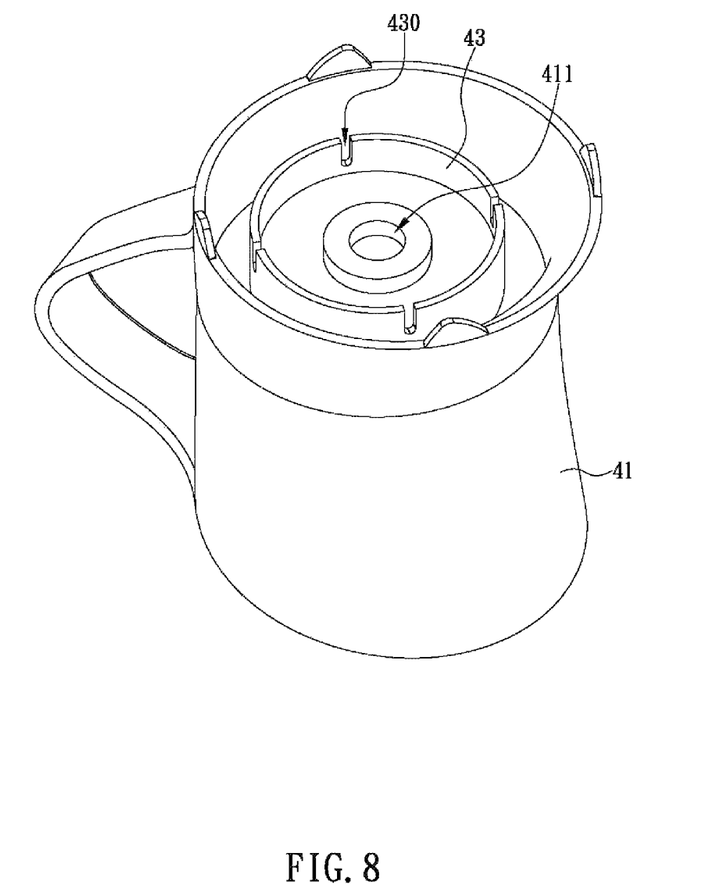
FIG. 8 is a perspective view of a container main body according to another embodiment of the present invention.

While the at least one engaging element in the foregoing embodiment is each composed of two engaging plates, the at least one engaging element may have other configurations in other embodiments of the present invention. As shown in FIG. 8, the engaging element 43 is an annular body provided on the bottom side of the container main body 41. The engaging element 43 surrounds the through hole 411 and is provided with a plurality of grooves 430, wherein each groove 430 extends inward from the bottom side of the engaging element 43. Thus, when it is desired to connect the water-stopping plate 35 in FIG. 4 to the bottom side of the container main body 41, each guide rail 355 can be readily inserted into the corresponding groove 430. In addition to the configuration described above, the engaging element 43 may be redesigned to include a plurality of plates, each having at least one groove 430, and the aforesaid effects of the present invention are equally achievable.

In order to cope with differently sized cup openings and further increase the convenience of use of the tea brewer of the present invention, referring back to FIG. 4, the bottom side of the water-stopping plate 35 is additionally provided with a pressing portion 357. The pressing portion 357 is formed by an extension from the periphery of the bottom side of the water-stopping plate 35 in a direction away from the through hole 311. Thus, the potential contact area of the water-stopping plate 35 is significantly increased, allowing the tea brewer 3 to be used with cups of different opening sizes. Besides, the tea brewer 3 of the present invention includes a watertight washer 38 fitted in the container main body 31 at a position adjacent to the through hole 311. The watertight washer 38 is formed with an aperture 380 so that liquid in the container main body 31 can flow out of the container main body 31 through the aperture 380 and the through hole 311. It should be pointed out that, once the watertight washer 38 is installed in the container main body 31, the aperture 380 is located within the through hole 311; therefore, liquid flowing through the aperture 380 can be viewed as flowing through the through hole 311. Additionally, the watertight washer 38 is provided with a stop member 381 adjacent to and surrounding the aperture 380. With the top side of the stop member 381 being higher than the top side of the watertight washer 38, the water-stopping block 36 presses tightly against the stop member 381 when covering the aperture 380 (equivalent to covering the through hole 311); thus, the watertightness of the container main body 31 is enhanced. Moreover, since the top side of the stop member 381 is higher than that of the watertight washer 38 and unlikely to be obstructed by other parts of the watertight washer 38, the stop member 381 is allowed relatively great deformation and can therefore work with water-stopping blocks 36 of different volumes.

While the invention herein disclosed has been described by means of specific embodiments, numerous modifications and variations could be made thereto by those skilled in the art without departing from the scope of the invention set forth in the claims.

What is claimed is:

1. A tea brewer structure configured for easy disassembly and cleaning, comprising:
   a container main body having a top side concavely provided with a receiving space and a bottom side formed with a through hole in communication with the receiving space;
   at least an engaging element provided on the bottom side of the container main body and provided with at least a groove extending inward from a bottom side of each said engaging element, wherein each said engaging element is composed of two engaging plates which are separated by a spacing defining a said groove;
   a water-stopping plate detachably connected to the bottom side of the container main body and having a top side protrudingly provided with a post, the post extending into the receiving space through the through hole, the water-stopping plate being provided with at least a flow-guiding hole adjacent to the post, the water-stopping plate being peripherally provided with at least a guide rail received and reciprocally movable up and down in a corresponding said groove; and a water-stopping block detachably connected to a top end of the post and located in the receiving space, wherein when a top side of each said guide rail is pressed against an inner bottom surface of the corresponding groove, the through hole is not covered by the water-stopping block, and when each said guide rail is moved away from being pressed against the inner bottom surface of the corresponding groove, the water-stopping block is moved toward the through hole until the through hole is covered by the water-stopping block.

2. The tea brewer structure of claim 1, wherein each said guide rail has a longitudinal length far greater than a lateral width of the corresponding groove such that the water-stopping plate has a tilt angle limited to 0~5 degrees.

3. The tea brewer structure of claim 2, wherein the water-stopping plate has a bottom side provided with a pressing portion, the pressing portion being an extension from a periphery of the bottom side of the water-stopping plate in a direction away from the through hole.

4. The tea brewer structure of claim 3, further comprising a watertight washer, wherein the watertight washer is fitted in the container main body at a position adjacent to the through hole and is provided with an aperture.

5. The tea brewer structure of claim 4, wherein the watertight washer is provided with a stop member adjacent to and surrounding the aperture, the stop member having a top side higher than a top side of the watertight washer.

6. The tea brewer structure of claim 5, wherein the bottom side of the container main body is peripherally provided with a plurality of foot plates.

\* \* \* \* \*